July 19, 1966     T. B. WAYNE     3,261,690
EXTRACTIVE MILLING OF RICE IN THE PRESENCE OF AN ORGANIC SOLVENT
Filed Nov. 3, 1964     5 Sheets-Sheet 1

INVENTOR.
TRUMAN B. WAYNE
BY Browning, Simmons,
Hyer & Eickenroht
ATTORNEY

July 19, 1966    T. B. WAYNE    3,261,690
EXTRACTIVE MILLING OF RICE IN THE PRESENCE OF AN ORGANIC SOLVENT
Filed Nov. 3, 1964    5 Sheets-Sheet 2

INVENTOR.
TRUMAN B. WAYNE
BY Browning, Simms,
Hyer & Eisenrauth
ATTORNEY

July 19, 1966     T. B. WAYNE     3,261,690
EXTRACTIVE MILLING OF RICE IN THE PRESENCE OF AN ORGANIC SOLVENT
Filed Nov. 3, 1964     5 Sheets-Sheet 3

INVENTOR.
TRUMAN B. WAYNE
BY *Browning, Simms,*
*Hyer & Eisenrohr*
ATTORNEY

TRUMAN B. WAYNE
INVENTOR.

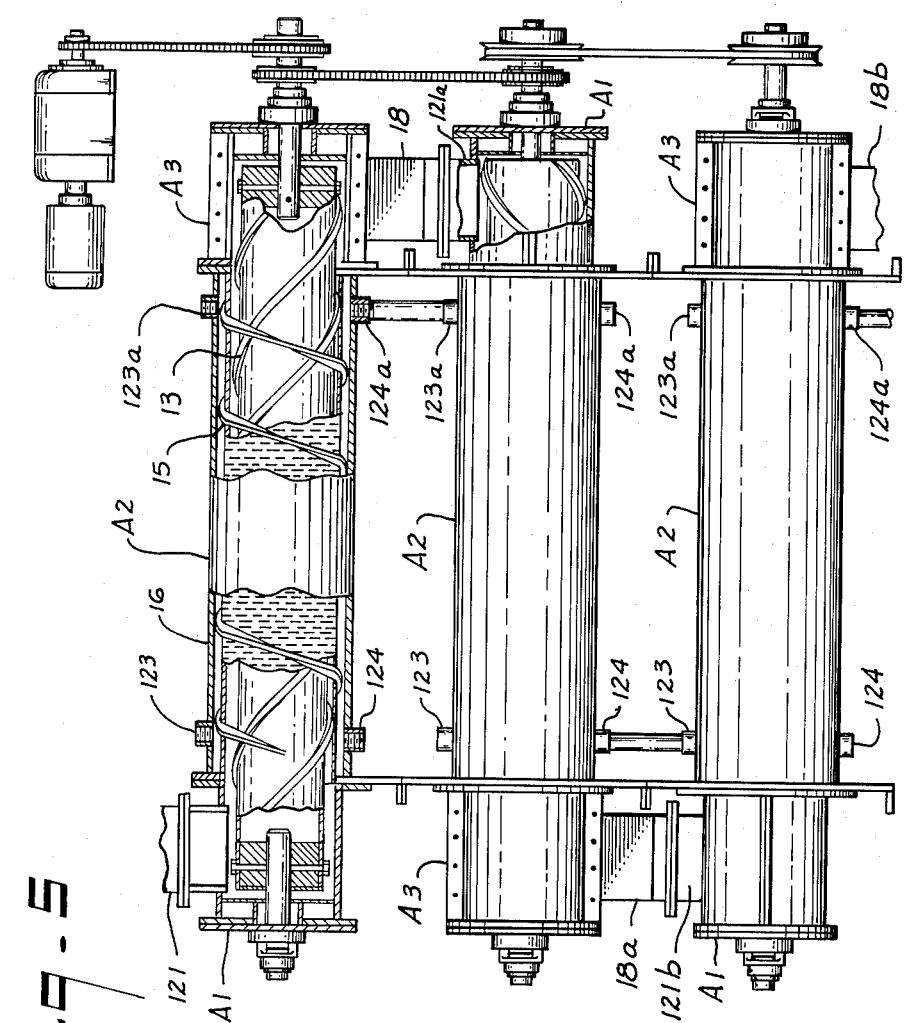

United States Patent Office 3,261,690
Patented July 19, 1966

3,261,690
EXTRACTIVE MILLING OF RICE IN THE PRESENCE OF AN ORGANIC SOLVENT
Truman B. Wayne, P.O. Box 13086, Houston, Tex.
Filed Nov. 3, 1964, Ser. No. 408,702
23 Claims. (Cl. 99—80)

This invention relates to improvements in the milling of rice and barley and is a continuation-in-part of my co-pending applications Serial No. 308,115, filed September 11, 1963, and Serial No. 107,505, filed May 4, 1961, said Serial No. 308,115 being a continuation-in-part of my prior copending applications, Serial No. 43,351 filed July 18, 1960 and Serial No. 81,969 filed January 11, 1961, all of the foregoing now abandoned.

In the conventional rice milling process of commerce, the rough, or paddy, rice is first cleaned of dirt, straw and other debris and is then sent to stone shellers which remove the hulls and most of the loosely adhering bran within the hull enclosure surrounding more adherent bran layers over the endosperm. Rice with its hulls removed is called "brown rice" and retains its light-brown bran coat. This bran coat is made up of seven distinct layers which envelop the starchy interior of the kernel.

It is customary to remove most of the six outer layers and a part of the seventh, or aleurone, layer in succeeding milling operations. Since the aleurone cells are rich in protein, and this constituent is present also in the endosperm, only about 10 percent of the protein of the hulled rice is removed in the milling process. The oil, present largely in the bran and germ, is removed to the extent of about 85 percent; and nearly 70 percent of the mineral salts originally present in the hulled rice is removed, principally in the bran.

The hulled brown rice is then milled in machines which consist essentially of a horizontal, cylindrical shell having perforations against which the rice is rubbed by a rapidly revolving, tapered, inner core having a ribbed surface. This surface-grinding operation is carried out under retention time and feed rate conditions which will produce the desired degree of removal of the outer bran layers from the rice kernel. This milling process is rather severe and breaks a substantial proportion of the whole rice grains into two or more fragments, this breakage being due to a combination of effects such as physical impact, thermal and mechanical stresses and generated heat. The breakage of rice kernels varies with the variety, state of curing, handling in the rice dryer and subsequent storage, and the severity of milling. Since broken rice sells for only about one-half the price of the whole head rice kernels, this breakage results in serious economic loss.

It is an object of the present invention to provide an improved rice-milling process in which breakage of rice grains during milling is greatly reduced.

Another object is to provide an improved rice-milling process in which rice is cooled with an extractive solvent during milling and heat checking of rice kernels is prevented.

Another object is to provide such process wherein bran or brown rice kernels is maintained in an increasingly wet and softened condition during milling to allow more complete and selective removal thereof from the starchy endosperm.

Another object is to provide such process which may be operated in more flexible manner for the removal of bran coating surrounding the inner portion, or endosperm of the rice kernels to any desired extent which their end uses require.

Another object is to provide such process which results in improved milled rice, rice oil, and bran products.

Another object is to provide a substantially fat-free milled or undermilled rice product which has superior keeping qualities.

Another object is to provide such process in which a wider variation in the properties of the rice product as to retention of nutritional constituents of the bran layers, cooking qualities, and physical appearance of the rice are easily attained.

Generally stated, applicant's new process comprises milling bran from brown rice in the presence of a solvent effective to extract fatty components from the rice and germ. In simultaneous milling and extraction, the solvent performs five functions: (a) extraction and removal of fats and coloring matters from bran and germ; (b) maintaining the bran in a wet and increasingly softened condition on the rice kernels; (c) as a liquid medium for flushing comminuted bran particles from the grain; (d) flushes openings, such as openings in the screen of a mill, free from bran particles and increases the efficiency of milling; and (e) cools the rice during the milling process and effectively prevents heat checking of the rice and thus substantially reduces breakage of the kernels, and permits effective milling under mild conditions which reduce stresses on the rice with further reduction in breakage. The solvent also exterminates any insects which may be present and sterilizes any insect eggs which may have been laid into the brown rice grains. Both bran and rice from this process are substantially sterile with respect to insect infestation.

The brown rice may be derived from raw, rough or paddy rice, or from raw, rough or paddy rice which has been parboiled and dried prior to removal of the hulls. The brown rice may be derived from any commercial grade of rough rice which is normally bought and sold in commerce. The rice product of this process is of improved quality in that removal of the oil and coloring matters, and inhibition of enzyme action by the solvent during the milling process results in a rice which has improved flavor, improved cooking qualities and improved keeping qualities. The bran from this milling process also is lighter in color and has improved keeping qualities, while a rice oil extracted under those conditions may be recovered from the solvent and easily refined to provide a very light colored, edible oil of low acidity.

Bran on the rice may be softened prior to the milling step according to the process of my co-pending applications Serial No. 308,115, filed September 11, 1963, and Serial No. 107,505, filed May 4, 1961. In these applications it is shown that bran on the bran rice may be softened with a liquid bran-softening agent and that a great many materials are suitable softening agents. For example, non-toxic oils are excellent softening agents, and these include highly refined mineral oils and edible vegetable oils. Naturally occurring or synthetic esters of glycerol, propylene glycol, polypropylene glycol, or sorbitol with fatty acids may be used. In addition to such oily materials, propylene glycol, polypropylene glycol or aqueous solutions of alkaline salts such as hydroxides and carbonates of ammonium and alkali metals or of soaps of higher fatty acids may be used as softening agents as well as aqueous solutions of neutral salts of ammonium, sodium and potassium. Very dilute aqueous solutions, of one percent concentration or less, of hydrochloric, sulfuric, phosphoric and citric acids or other acids which are non-toxic in the small proportions used are also good softening agents.

When such softening agents are used, bran is milled from the brown rice in the presence of both the softening agent and a volatile organic solvent effective to extract fatty components from the bran and germ. When rice oil is recovered by the practice of the present invention, recycled rice oil or an oil-containing miscella, i.e., a solution of rice oil in an organic solvent, is a preferred bran-softening agent since it is produced in the process and recovered from the brown rice at low cost so that there is little reason for using any other bran-softening agent.

Use of recycled rice oil in the strong miscella of applicant's process avoids the necessity of a bran-softening step prior to the milling step. This miscella will contain from 3 to 10 percent of oil as recycled from a settler, filter or other apparatus adapted to remove bran solids therefrom. Strong miscella introduced into the mill during the milling step and in contact with the brown rice therein will soften and loosen the bran very quickly to a degree sufficient to improve the bran removal under milling conditions which are of considerably less than normal severity. However, weaker miscella or even the solvent will effect a considerable degree of softening in the wet milling process, although milling pressures must be somewhat increased to compensate for the lesser bran layer softening effect. The breakage of rice kernels will increase somewhat when the solvent used during milling contains little or no oil or other bran softening agent, but the yields of unbroken head rice are still superior to those obtainable from dry milling.

Any organic solvent which is effective to extract fatty components from the brown rice during the milling process may be used provided the solvent has sufficient volatility that it may be completely removed from the rice and bran at temperatures below that at which the rice or bran is damaged. Among the preferred solvents are low boiling, highly refined petroleum fractions, such as n-hexane and n-heptane. In addition to non-polar solvents of this type, polar solvents such as alcohols and ethers, may be used, as for example, ethanol, isopropanol, ethyl ether, or dichloro diethyl ether. Chlorinated hydrocarbons as for example ethylene dichloride and trichloro ethylene also may be used. Mixtures of such solvents, especially mixtures of non-polar and polar solvents, are especially useful.

Instead of employing a pure, relatively anhydrous solvent, the extraction may be accomplished with a solvent or solvent mixture which will dissolve a smaller proportion of water, preferably to form a constant boiling azeotrope. An azeotropic solvent is conveniently handled in this process since it tends to provide a constant boiling, uniform extracting medium containing a small percentage of water which aids in the wetting and penetration of the bran layers, and yet does not contain nor substantially impart free water to the hydratable constituents, e.g., starch, sugars, etc., of the inner aleurone layer and the starchy endosperm. Any excess of water picked up from the brown rice by condensation from air and/or from other sources is lost in an azeotropic distillation step during recovery of the solvent.

In the present process, extraction of the brown rice during the milling step may be only one in a series of steps of extracting the bran and milled rice with solvent. Unseparated, milled rice and bran may be withdrawn from the milling step together and passed to subsequent extraction and separation steps or there may be substantial separation of bran from milled rice in the mill and separate withdrawal of bran to one or more subsequent extraction steps, such as filtration and washing bran on a filter with fresh solvent or dilute miscella, while milled rice containing residual bran is withdrawn to one or more subsequent extraction and separation steps.

The series of extraction steps including extraction during milling of the brown rice preferably are conducted countercurrently. That is, the milled rice receives a final washing with fresh solvent before being passed to a desolventizing step and solvent used in this washing is passed on through one or more extraction steps into the mill where it comes in contact with freshly introduced rice and bran. However, as shown below, concurrent or mixed flow may be used in the milling and rice washing steps, and under some conditions where a higher residual oil content is desirable, may be preferred. Any or all rice extraction steps, after milling, also may be omitted if desired. The process of the present invention may be employed advantageously in connection with the processes disclosed in applicant's U.S. Patents Nos. 3,085,012 and 3,085,013, relating to pre-cooked, dehydrated rice product and processes for the preparation thereof. The brown rice is processed to any desired stage of refining, separated from any solvent used and any resulting bran; and without further processing, it is immediately sent to the steeping or cooking operations described in the above patents or any similar processes. This obviates the necessity for any finishing, drying, polishing and grading operations on the rice which is to enter further processing instead of being finished and packaged for the trade.

Other rice products, such as parboiled rice, expanded rice and other specialty rice products may conveniently be prepared from brown rice which has been solvent extracted during milling to various degrees, ranging from a very light removal to complete removal of the bran layers. Preparation of such products may be accomplished in separate batch or continuous soaking and steaming apparatus or in additional desolventizer apparatus which is provided with steam injection. Rice thus treated instead of by the usual parboiling process while in the paddy state provides a product of superior color and cooking qualities. It may be dried to the usual hard, dense product in conventional drying equipment after the pre-gelatinizing operation, or may be dried and expanded into a porous, quick-cooking rice product in accordance with the disclosures of applicant's Patent No. 3,085,013. Other objects and advantages of this invention will appear from the detailed description, taken in connection with the accompanying drawings wherein:

FIG. 5 is an enlarged and more detailed elevation, partially broken away of an assembly of milling screw conveyors shown schematically in FIG. 1.

Figure 1:
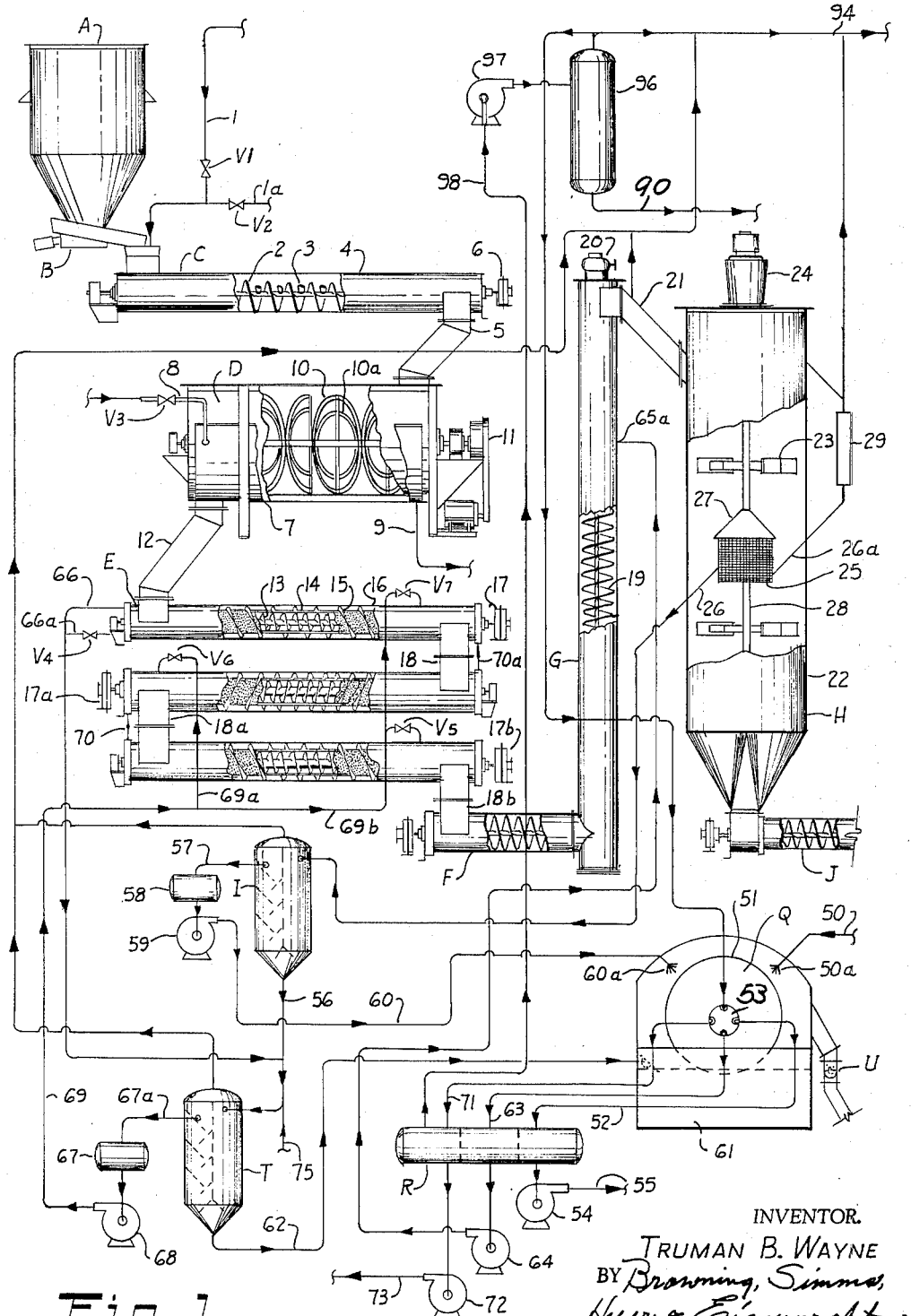
FIG. 1 is a part of a flow diagram illustrating one embodiment of this invention.
Figure 2:
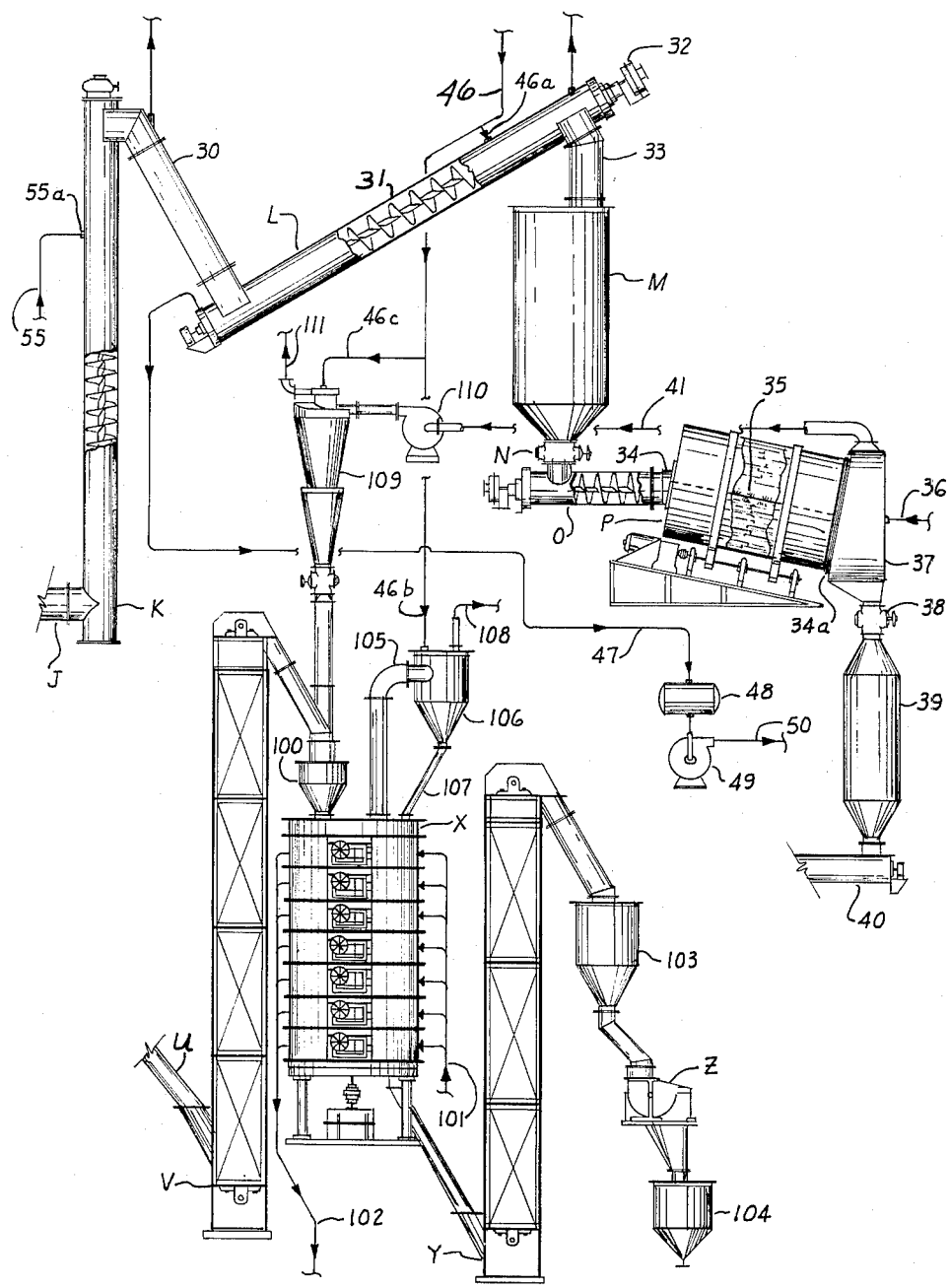
FIG. 2 is a continuation of the flow diagram of FIG. 1 to the right thereof.
Figure 3:
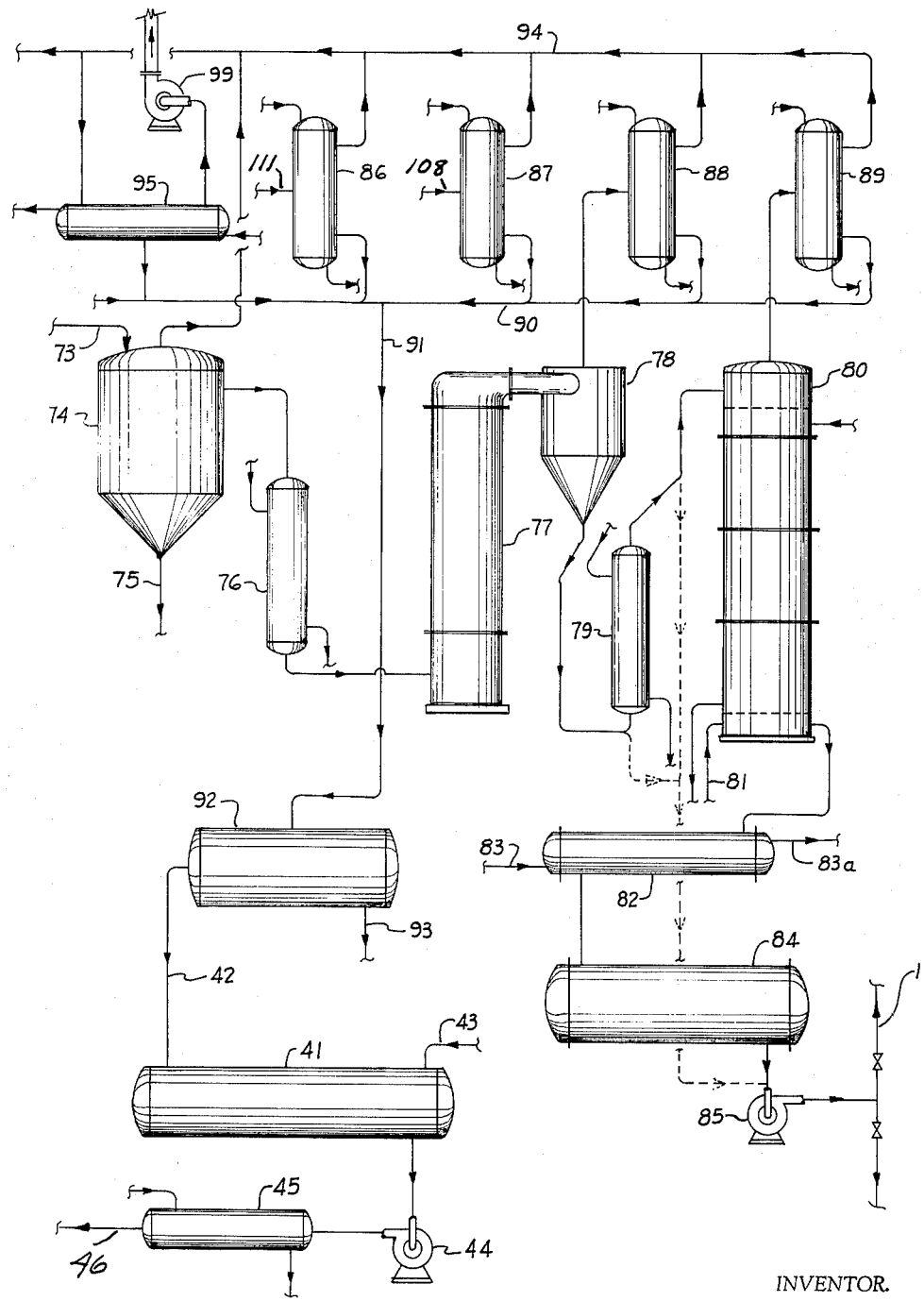
FIG. 3 is a continuation of the flow diagram of FIG. 2 to the right thereof.

FIGS. 1, 2 and 3 cooperate to form a schematic flow diagram of one embodiment of the complete process inclusive of solvent extraction and recovery operations, and illustrate the principal apparatus in proper process sequence. The process sequence and apparatus of the present invention each consist of a combination of new and old elements which when operatively connected allow the practice of the invention in several alternative forms, each of which differs widely from present day rice milling practices.

In the schematic flow diagram of FIG. 1, the combination of apparatus elements shown consists of a storage hopper A from which the brown rice, or brown rice admixed with bran removed in preceding stone shellers, is fed by means of vibrating feeder B into mixing screw conveyor C where it is mixed with a relatively smaller volume of a bran-layer-softening agent from pipe 1 or 1a by the required manipulation of valves $V_1$ and $V_2$. Valve $V_1$ is opened and valve $V_2$ is closed when rice oil from oil storage tank 84 (FIG. 3) is sent by pump 85 to be used in mixing screw conveyor C. However, if a bran-layer-softening agent other than rice oil is used, it is received through pipe 1a and valve $V_2$ from a storage vessel, metering pump or other source (not shown).

As an alternate to the use of recycled rice oil which has been desolventized in stripping equipment 80, cooled in oil cooler 82 and withdrawn from oil storage tank 84 by means of pump 85, oil containing a substantial amount of solvent may be by-passed from evaporator-separator 78 or preheater 79 to pump 85 and pumped through pipe 1 to mixing screw conveyor C. Also, where it is desired that the degree of milling accomplished in milling screw assembly E be reduced, the use of a bran-layer-softening agent in any of the above described manners may be eliminated, and instead the bran-layer-softening effects of the counter-current solvent streams entering through discharge chute 18b, and through pipes 69a and/or 69b which enter the milling screws respectively at valves $V_5$, $V_6$ and/or $V_7$, may be relied upon since such solvent streams are relatively rich in oil at this stage of the extraction process. Furthermore, even fresh solvent which is free from oil has a marked selective softening effect on the bran layers, and when milled in the wet state the bran is removed much easier than when in the dry state.

Screw conveyor C is equipped with a spiral scroll 2 which is fitted with mixing paddles 3. The latter are set to oppose and somewhat retard the progress of the treated rice in its travel through conveyor housing 4 to discharge spout 5 at the opposite end. Conveyor assembly C is driven by a motor-reducer 6 which is equipped for constant speed or variable speed service.

The rice enters continuous ribbon mixer D which is a commonly used blender for dry materials, or dry materials with liquids. In order to accelerate the softening effect of the treating agent on the bran coating, the temperature of the rice mixture should preferably be between 90° F. and 140° F., and this is accomplished by either preheating the oil or other softening agent, or by heating the rice-oil mixture in ribbon mixer D by means of steam in a steam jacket 7 which surrounds the U-trough of the mixer, and which receives steam or hot water through pipe 8 and discharges condensate or water through pipe 9. The regulation of the temperature within the mixer may be accomplished by setting of valve $V_3$, or the latter may be the type which is operated by a temperature controller. The ribbon spirals 10 and 10a in the mixer thoroughly mix the rice with the softening reagent at speeds ranging preferably between 40 and 120 r.p.m. although faster or slower speeds may be used. The drive may be either a constant speed or variable speed motor-reducer assembly 11.

The rice, now thoroughly wetted and mixed with the bran-layer-softening agent, is discharged through discharge spout 12 into the upper milling screw conveyor of an assembly E preferably of two or more of such milling screw conveyor units arranged for continuous operation. Each milling screw conveyor in assembly E consists of an inner screw conveyor scroll 13 arranged to operate within cylindrical, perforated screen 14 which is supported within continuous spiral baffle 15 attached to the inside wall of the outer cylindrical housing 16. The latter may conveniently be a length of pipe or steel tubing of 10 gauge wall thickness or greater. Its function is to house the inner conveyor parts and act as a rigid support to keep them in alignment. Scroll 13 is driven at any convenient speed, usually between 50 and 150 r.p.m by drive 17 which consists of a motor and speed reducer. While normally all of the milling screw conveyor units of the assembly E are driven at the same constant speed, and one drive can operate all units through inter-connecting sprockets and drive chains, it is often desirable to gradually increase the milling pressure within a unit by slightly slowing down the speed of the unit which follows and receives from the preceding unit. This is possible when drives 17, 17a and 17b are capable of speed variations which are carefully set by manipulation of the speed adjustment device on each drive and observing the speed with a tachometer. Large speed variations must, of course, be avoided to prevent choke-ups in apparatus having the positive displacement characteristics of a screw conveyor, but advantage is taken of the pressure increase thus obtainable to control the milling action on the rice in contact with the perforated trough 14.

FIG. 5 illustrates each unit of assembly E comprising similar assembly units A1, A2 and A3 which are respectively the feeder, milling and conveying, and the discharge sections. The discharge section of each preceding unit is connected to the feeder section of the unit which follows it, with the discharge section of the final unit connected to a succeeding apparatus in the process sequence. As previously explained above, the sequence of these assembly components for each unit is reversed between odd and even numbered units of an assembly of two or more units.

Preferred rotor speeds for the milling extractor shown in FIG. 5 will vary from 600 r.p.m. for a 6" overall diameter rotor of up to 30" overall length to as slow as 200 r.p.m. for a 24" rotor of 120" overall length. Normal rotor lengths are usually based on a diameter to length ratio of from 1 to 5 up to 1 to 10 for the higher rotation speeds of this apparatus instead of the 50 to 150 rotation speed employed by the considerably longer milling screw conveyor units containing conventional helicoid flights or such modifications thereof as cut flight, cut and folded flight, spiral flight with opposing paddles and the like.

The numbers 121, 121a and 121b refer to the receiving or inlet chutes; 18, 18a and 18b to the outlet chutes, such as to screw conveyor F in FIG. 1. Threaded pipe couplings, or alternately flanged pipe nipples 123, 123a, 124 and 124a are provided identically top and bottom welded to the outer shell 16 of section A2 of each unit, and are piped as required to provide the desired concurrent, countercurrent or mixed flow pattern of the solvent medium through the apparatus. The flow may be sequential from one unit to the other or, depending on processing procedures may originate from, or discharge to other apparatus in the process. Unused pipe connections are closed with suitable pipe plugs or valving arrangement.

The rice proceeds through the successive milling screw conveyors comprising apparatus assembly E and is discharged through discharge spouts 18, 18a and 18b (FIG. 1) in succession and enters into screw feeder F which delivers the rice to vertical screw conveyor G. Screw feeder F is operated at a speed sufficient to receive the rice from the final unit of milling screw conveyor E and to continuously feed it into the lower section of elevator G. The latter is equipped with a vertical screw flight of sufficient capacity to elevate rice from the preceding equipment into solvent extraction apparatus H by means of its vertical scroll 19 which is driven by drive 20 and discharges through discharge spout 21.

Solvent-extraction apparatus H consists of a cylindrical tank shell 22 in which is suspended a double turbine agitator 23 which is driven by motor-reducer 24. Suspended within the tank is a screen strainer 25 which is anchored in place by pipes 26 and 26a. Above this screen strainer is a revolving cone 27 which is attached to the shaft 28 of the agitator 23. This cone and screen arrangement prevents the rice from entering solvent-discharge pipe 26 but allows the solvent carrying the bran which is separated from the rice kernels to flow to weak miscella settling tank I as the heavier rice kernels settled into the conical bottom of extraction apparatus H. The solvent level in extraction apparatus H may be observed in sight glass 29.

Screw feeder J removes the rice from extraction apparatus H and feeds it into vertical screw elevator K (FIG. 2) which is of substantially identical construction as vertical screw elevator G previously described. Rice is delivered through discharge spout 30 into inclined screw conveyor L which by means of its screw flight 31 and drive 32 elevates and delivers the fully extracted rice through discharge spout 33 into storage hopper M.

Screw feeder O receives the drained, solvent-extracted rice through rotary feeder N which operates at a predetermined rate and also acts as a gas lock between desolventizer P, screw feeder O and preceding apparatus. Desolventizer P consists of a rotary drum equipped with internal lifter flights which serve to lift and cascade the solvent-containing rice into the superheated steam atmosphere provided by the nozzles 35 in multiple arrangement along steam pipe 36. The rotating drum rotates in seals 34 and 34a to prevent loss of vaporized solvent and water vapor, and which will allow pressures slightly above atmospheric to be maintained within the rotating drum. The rice is discharged from the rotating drum into discharge housing 37 from which it is withdrawn by rotary feeder 38 which also acts as a gas lock between the desolventizer and receiving hopper 39. The desolventized rice containing from 10 to 14 percent moisture and substantially solvent free is withdrawn from hopper 39 by means of conveyor 40 and is carried to cooling, finishing, grading and packaging operations which are accomplished in conventional equipment.

The course of the solvent is countercurrent throughout the particular embodiment of the process illustrated in FIGS. 1 to 4 but concurrent or mixed flow may be used if desired. The solvent performs five functions, i.e., extraction of fatty constituents and coloring matter from the bran layers and germ residue; maintaining of the bran layers in wetted, relatively soft condition to facilitate their removal from the endosperm; as a liquid medium for flushing off the comminuted bran particles from the surface of the residual endosperm; as a cooling and lubricating medium during the bran removal operation; and as a liquid medium for flushing of bran particles from the openings in perforated metals, wire mesh screens and in the annular spaces in milling screw conveyor E between the outer steel shell 16 and the perforated inner cylinder 14 which houses the screw flight conveyor 13 of each section.

Recovered solvent from solvent storage tank 41, which has been derived from the solvent-recovery operations and any makeup solvent entering through pipe 43, is sent through solvent line header 45 by pump 44 into pipe 46 which delivers it into inclined screw conveyor L at point 46a where the solvent imparts the final rinse to the solvent-extracted rice and runs down inside the conveyor countercurrently to the rising rice stream and flows through pipe 47 into receiving tank 48. This final rinse solvent is then sent by pump 49 through pipe 50 to vacuum filter Q where it enters at spray header 50a which imparts through its nozzles the final wash to the bran cake on the filter drum 51. The washings are discharged from filter Q through pipe 52 from rotary valve 53 into compartmented miscella-receiving tank R from which it is sent by pump 54 through pipe 55 to vertical screw conveyor K which it enters at point 55a and courses downward countercurrently to the rising rice column, passes through screw feeder J and enters extraction apparatus H where it rises countercurrently to the descending stream of rice. Sufficient agitation and swirling is maintained in this vessel to effectively remove the loosely adhering bran and wash it out of the apparatus through screen 25 and pipe 26 into weak miscella settling tank I where the bran is settled and drawn off continuously as a slurry in pipe 56 and sent to strong miscella settling tank T where it is combined with the bran slurry received from the bran removal and extraction steps conducted in milling screw conveyor assembly E.

The clarified solvent from weak miscella settling tank I is sent through pipe 57 to receiving tank 58 from which it is sent by pump 59 through pipe 60 to spray header 60a where it is used as the first wash on the bran cake on filter drum 51. This bran cake has been deposited on drum 51 from filter trough 61. The solvent washings from this first stage wash on filter drum 51 consist of filtered weak miscella which has gained some rice oil concentration through its use as the first wash on the cake produced from bran settlings from strong miscella settling tank T which have been received in filter trough 61 through pipe 62. The wash effluent from vacuum filter Q passes from rotary valve 53 into pipe 63 which discharges it into the second compartment of miscella-receiving tank R. Pump 64 then delivers this filtered weak miscella through pipe 65 to vertical screw elevator G where it enters at point 65a and flows downward countercurrently to the rice being lifted by means of screw 19. The weak miscella continues its countercurrent course through screw feeder F and the several horizontal milling screw conveyor sections of apparatus E.

During its countercurrent course through apparatus assembly E, which is both a milling screw conveyor and a countercurrent solvent extraction apparatus, the weak miscella gains in oil concentration by contact with the freshly removed bran layers and germ residues. It is joined in each horizontal conveyor section by recirculated strong miscella as will later be explained. The combined stream leaves the upper horizontal conveyor section by means of pipe 66 and/or 66a, the latter being a by-pass of the upper end of pipe 66. The extent to which this by-passing occurs is controlled by setting of valve $V_4$. The combined solvent stream is now the strong miscella containing the maximum content of rice oils, and flows through the extension of pipe 66 into strong miscella settling tank T where the bran is settled and is sent as a relatively dense slurry through pipe 62 to filter trough 61 where it undergoes the filtering and extraction washings previously described. It is then discharged from filter Q into conveyor U which delivers it to elevator V. The settled strong miscella decanted from settling tank T flows through pipe 67a into receiving tank 67 from which it is drawn by means of pump 68 and recirculated back to apparatus assembly E through pipe 69 and branching pipes 69a and 69b. The recirculated strong miscella is introduced into the circular annulus between perforated shell 14 and outer shell 16 of each horizontal milling screw section by means of valves $V_5$, $V_6$ and/or $V_7$ where it flushes out the bran layer which has extruded through the perforations of perforated shell 14 and transports it to the next preceeding horizontal milling screw section by means of pipes 70 and 70a. The strong miscella-bran suspension then enters strong miscella settling tank T as previously explained. In its course through the several sections of apparatus E all of the recirculated strong miscella may enter the final horizontal milling screw section through valve $V_5$ and swirl through the circular annulus which is baffled by circular spiral 15, exiting partially through pipe 70 and partially through spout 18a to the next preceding horizontal milling screw from which it in like manner enters the first horizontal milling screw section through pipe 70a and spout 18. Alternatively, the flow of recirculated miscella may be apportioned between the several horizontal milling screw sections by means of valves $V_5$, $V_6$ and/or $V_7$, respectively. In any event all recirculated strong miscella blends with the weak miscella entering countercurrently from vertical screw elevator G through screw feeder F, and the blended miscellas which have been enriched in oil content by the extraction occurring in apparatus E are returned through pipe 66 to strong miscella settling tank T as previously explained.

Since strong miscella is contained in the settled bran slurry going from strong miscella settling tank T to the trough 61 of filter Q, and filtered weak miscella is constantly entering the strong miscella by means of pipe 65a, the oil concentration of the final strong filtered miscella leaving the filter by means of pipe 71 from filter rotary valve 53, miscella-receiving tank R, pump 72 and pipe 73 is relatively constant for any ratio of brown rice to solvent entering the extraction system.

The filtered strong miscella is sent to the oil and solvent separation and recovery system by means of pump 72 and pipe 73 where it enters filtered miscella clarification tank 74. The settlings are returned to strong miscella settling tank T by means of pipe 75 and the clarified miscella is passed through preheater 76 into the calandria 77 and into evaporator-separator 78. The concentrated oil-containing miscella is then drawn through preheater 79 into stripping column 80 where the solvent-containing oil is stripped of solvent by live, superheated steam which enters through pipe 81. In FIGS. 1, 2 and 3 where unnumbered pipes are indicated with directional arrows entering the several preheaters, the calandria, stripping column and the several condensers these refer to steam entering and condensate leaving such apparatus.

The recovered crude rice oil, of higher quality than that recoverable by extraction of rice bran which has been removed by the conventional milling process and subsequently extracted, is sent through oil cooler 82 where it is cooled by water entering through pipe 83 and leaving through pipe 83a, and is then sent to crude rice oil storage tank 84 from which it may be drawn by pump 85 and sent to tank cars or trucks, or to a further refining operation which is not claimed as part of this invention. It may also be delivered to mixing screw conveyor C through pipe 1 to function as a bran-softening agent, as previously described.

Solvent together with water condensed in the several condensers 86, 87, 88 and 89 which serve the evaporator-separator 78, stripping column 80, and desolventizers P and X all collect in wet solvent pipe header 90, drain into pipe 91 and are collected in solvent-water separator 92 from which water is discarded through drain pipe 93 and recovered, dry solvent flows through pipe 42 to solvent tank 41. Any lost solvent is replenished through make-up pipe 43, and the solvent again enters the extraction cycle previously described.

The various condensers, extractors, etc. are vented at their high points to a solvent vapor header 94 which connects to refrigerated condenser 95 and also to solvent-separating tank 96 which receives compressed solvent vapors from vacuum pump 97. Liquid solvent leaves tank 96 and condenser 95 and enters liquid solvent header 90. The suction side of vacuum pump 97 provides the vacuum on miscella-receiving tank R for the operation of filter Q, and which are connected by pipe 98. Any residual incondensible gases remaining in the system after the solvent vapors are condensed in refrigerated solvent condenser 95 are blown to the atmosphere by blower 99.

Solvent extracted bran from conveyor U is delivered by elevator V into the receiving hopper 100 of desolventizer X which is generally of the multiple hearth type commonly used in solvent extraction of cottonseed meal, soya bean meal, etc. Each hearth receives heating steam from steam pipe 101 and discharges condensate through pipe 102. The desolventized bran is discharged from the bottom of desolventizer X into elevator Y which delivers it to hopper 103. From hopper 103 the bran is received and ground in hammer mill Z, and with or without further screening is sent to bran storage hopper 104 from which it is sacked or otherwise disposed.

Solvent and water vapors leave desolventizer X through duct 105 and enter vapor scrubber 106 where they contact a fine spray of fresh solvent from liquid solvent header 46 through branch pipe 46b. This removes the bran dust and returns it to the top hearth of desolventizer X through scrubber drain pipe 107. The clean vapors leave the scrubber through duct 108 which conducts them to condenser 87 which condenses solvent and water vapors and discharges them through wet solvent header 90 and pipe 91 to solvent-water separator 92.

Likewise, bran and polishings which are freed from the rice kernels in rice desolventizer P leave with the solvent vapor through duct 41 and are blown into cyclone separator 109 by fan 110. The exit vapors are scrubbed with fresh solvent from pipe 46c and are conducted through line 111 to condenser 86 which operates in the same manner as condenser 87, and with the same disposition of condensed solvent and water, and venting of wet solvent vapors to pipe 94.

The proportion of solvent to brown rice used in the above-described process is approximately 100 parts of brown rice to 110–120 parts of solvent by weight, although these proportions may be varied considerably without departing from the intent and spirit of the invention.

The yields of products are substantially quantitative, the only losses being inconsequential amounts of bran dust from the desolventizer scrubbers and cyclones. For each 100 pounds of brown rice averaging 12 percent moisture by weight, the yields are as follows:

| | Percent |
|---|---|
| Rice oil | 1.8 to 2.4 |
| Rice bran | 2.5 to 8.0 |
| Clean rice | 95.5 to 89.6 |

The rice oil yield varies with the variety of rice processed, the amount of stone bran returned to the rice from the stone shellers and to some extent according to whether the extraction is carried out countercurrently or concurrently. The rice bran yield varies with the degree of milling and polishing obtained in the milling screw assembly E, vertical screw elevators G and K, and in inclined screw L, the various screw feeders and in desolventizer-dryer P. The clean rice yield likewise depends on the degree of milling practiced in the above-described apparatus and its final moisture content. The yield figures given are on the basis of the same moisture content in the finished clean rice as was originally in the brown rice.

The preceding process description is applicable to the first and second embodiments hereinbefore described which employ either a non-aqueous solvent; a solvent such as an alcohol viz., ethanol or isopropanol which contains a relatively small proportion of dissolved water but which is nevertheless an efficient solvent for the fatty and coloring matters in brown rice, or a solvent mixture of a nonpolar solvent such as n-hexane, n-heptane or the like with a miscible polar solvent such as an alcohol. Such solvents and solvent mixtures may be constant boiling azeotropes containing water, or they may be anhydrous when originally entered into the process and finally attain azeotropic qualities by absorption of water from the rice. Any excess of water above that contained in the azeotrope will be separated and discarded in solvent-water separator 92. In general, free water in the solvent system, and water contents in the azeotrope in excess of 10 percent should be avoided to obtain best results.

If the bran-layer-softening agent is an oily material, it will be present in the rice oil product or may be separated therefrom in suitable separating apparatus (not shown). Bran-layer-softening agents which are capable of being emulsified into the solvent in contradistinction to being truly soluble therein usually tend to selectively wet and to be absorbed by the bran coating. Thus, they are removed from the solvent system in each cycle and remain in the bran fraction. If their tendency to emulsify rather than to dissolve in the less polar solvents and solvent mixtures is due to their water content, and possibly also due to solvent-insoluble substances, such as inorganic salts which are preferentially absorbed and removed in the bran layer, the solvent-soluble fractions which remain will be found in the recovered fatty oils where they may remain, or may be eliminated in subsequent oil-refining steps.

Figure 4:
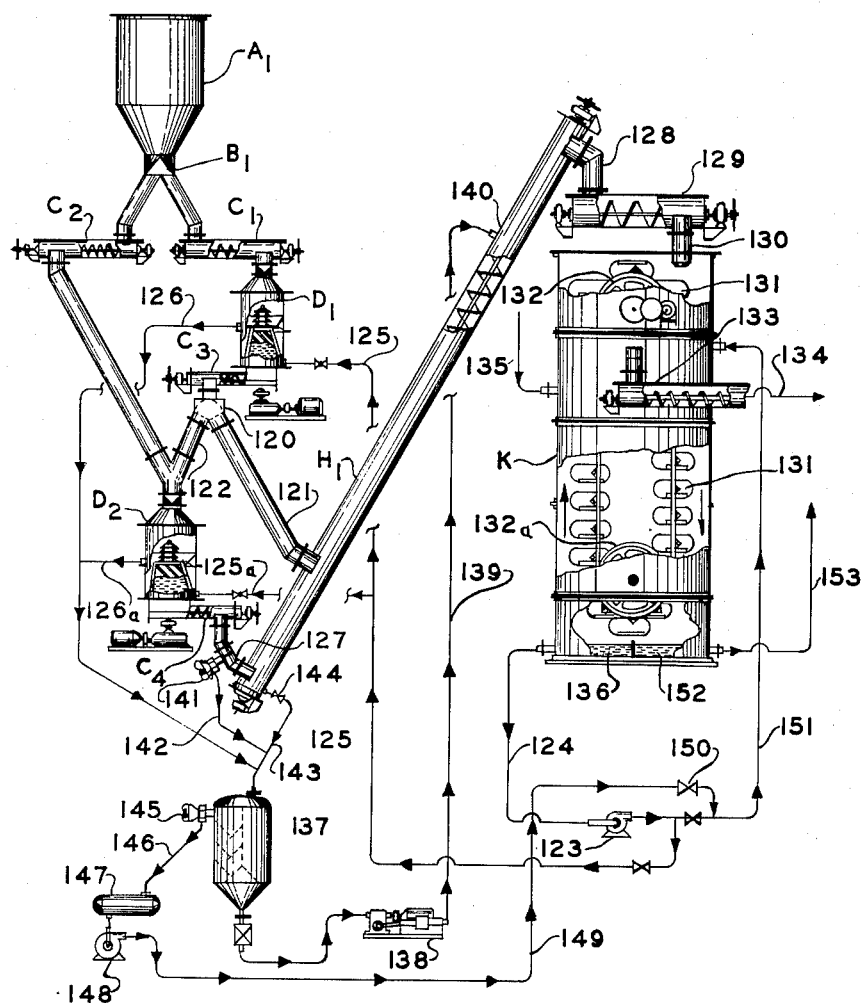
FIG. 4 illustrates schematically another embodiment of the extractive milling process of this invention.

In the schematic system illustrated in FIG. 4, brown rice, which may have been previously treated with a softening agent as described above, is delivered from holding tank $A_1$ by means of a suitable feeding device, illustrated as $B_1$, to screw feeders $C_1$ and $C_2$ from which the brown rice passes into the corresponding solvent extraction and milling units, designated generally as $D_1$ and $D_2$. If the combination solvent-extraction and milling units are operated in parallel, both screw feeders $C_1$ and $C_2$ are operated; and if the milling units are operated in series, only screw feeder $C_1$ is operated. The helicoid screw flight in the inoperative screw feeder $C_2$ in this case effectively seals off the flow of rice into unit $D_2$ and also prevents loss of solvent vapors from rice and bran withdrawn from unit $D_1$.

A screw feeder $C_3$ receives an effluent of bran and milled rice from unit $D_1$ and conveys it to a point above flap gate 120 which determines whether milled rice and bran from this unit will flow directly to the inclined conveyor $H_1$ through chute 121 and thus are products of single-stage milling, or whether the milled products from unit $D_1$ will be diverted through chute 122 to unit $D_2$ to receive a second-stage milling. Milling in both units $D_1$ and $D_2$ is roughly comparable to "first break" and "second break" milling in the conventional dry milling process. Some rice milling plants practice single-break milling which might be compared to operation of units $D_1$ and $D_2$ in parallel. The present process however differs from conventional single-break or second-break milling in that in either case milling occurs in the presence of a stream of solvent flowing through the mill in contact with rice, simultaneously extracting fatty components and inhibiting enzyme action.

The milling units $D_1$ and $D_2$ may be of any type desired but are illustrated as vertical, conical mills. Combinations of a vertical milling unit and one or more sections of horizontal milling units similar to those shown in FIGS. 1 or 5 comprise an excellent extraction milling system. Whatever type of mill is used however must be equipped with means for passing a liquid solvent through the mill in contact with the rice and bran in either concurrent or countercurrent flow. This means is illustrated as a pump 123 connected by line 124 to withdraw weak miscella from the bottom of a basket extractor, designated generally as $K_1$, and to pass the weak miscella through the mill in contact with the rice by valved inlet lines 125 and 125a. The housings of units $D_1$ and $D_2$ cooperate with the respective inlet lines 125 and 125a and outlet lines 126 and 126a to complete paths for extractive solvent through the mills.

Milled rice and bran are withdrawn together through chute 121 and/or 127 into the inclined screw conveyor $H_1$ and move upward to be discharged therefrom into chute 128 and pass through a screw feeder 129 into basket extractor $K_1$. The screw feeder 129 has a discharge spout 130 arranged to discharge the mixed bran and rice onto a series of moving baskets 131 carried on wheels 132 and 132a located in the top and bottom sections of the extractor, respectively. These baskets move in the direction illustrated by the arrows; and after the rice has been carried through a cycle moving downward and up, the baskets are tripped to discharge the rice and bran into a screw conveyor 133 from which the now completely extracted mixture of bran and milled rice is removed from extractor and sent, as indicated by the arrow 134, to desolventizing, separating, and finishing steps as desired.

Fresh solvent from a solvent-recovery system or other source (not shown) enters the extractor through line 135 and is sprayed upon the moving baskets 131 in conventional manner so that the fresh solvent washes the rice and bran in rising baskets just before the bran and rice are discharged from the corresponding basket into the outlet screw conveyor 133. The solvent trickles down through the baskets at a greater rate than that at which the baskets move upward so that there is a continual extraction of rice and bran in all upward moving baskets with solvent containing a continuously decreasing quantity of extracted oil as the rice-bran mixture rises to the outlet point.

A resulting weak miscella accumulates in chamber 136 below the rising baskets in the extractor. This weak miscella is withdrawn by line 124 and pump 123, and is sent as described above through inlet lines 125 and 125a to milling units $D_1$ and $D_2$. In passing through the milling units, in contact with rice and bran during the milling step, the miscella becomes stronger and is withdrawn by outlet lines 126 and 126a to a half-strength miscella settling tank 137. Any bran carried out of the mills by the flow of solvent settles to the bottom of tank 137 and a slurry containing this bran is withdrawn by pump 138 and line 139 and is introduced at 140 into an upper part of the inclined screw conveyor $H_1$ carrying mixed bran and rice from the mill. As the half miscella bran slurry flows downward through the rice-bran mixture moving upward in screw conveyor $H_1$, the rice-bran mixture is again extracted by the downward flowing miscella. Almost all of its bran content is filtered out as it flows downward. Miscella flowing downward through the screw conveyor $H_1$ may be withdrawn through a filter 141 and line 142 and an auxiliary line 143 containing a valve 144 which cooperate to provide a means for maintaining a level of miscella in the lower end of the screw conveyor $H_1$.

Miscella from the extraction step in the screw conveyor $H_1$ is thus returned to the half miscella settling tank 137 and any bran contained therein settles and is withdrawn by pump 138 as described above. Clarified miscella from the top of tank 137 is withdrawn by filter 145 and line 146 to a surge tank 147 from whence it is withdrawn by pump 148 and passed by line 149 containing valve 150 into line 151.

Line 151 introduces the half miscella into the moving basket extractor K at a point just below that at which the baskets receive mixed rice and bran from inlet spout 30. As the miscella becomes stronger in filtering downward through rice and bran on the downward moving baskets, it reaches maximum concentration and accumulates in chamber 152 in the bottom of the basket extractor. Strong miscella is withdrawn from chamber 152 by line 153 to a solvent-recovery system (not shown) where the solvent is separated from rice oil and any excess water.

As a result of a series of process steps described above, the rice is milled to any desired degree with lessened breakage of rice kernels, inhibition of enzyme action during the milling step and simultaneous extraction of fatty components and coloring matters so that the resulting rice and rice-oil by-product are of greatly improved quality. The flow of solvent through the mill also flushes bran from openings in any screen against which the rice is rubbed for removal of bran so that the milling process may be milder and still effective in the production of superior milled rice and by-products.

The preceding examples describe the more efficient countercurrent flow extraction procedures which result in substantially complete extraction of oil from the rice. Maximum keeping qualities are imparted to the rice by complete extraction of oil, but the color and keeping qualities of the rice are improved by extraction of any substantial proportion of oil and coloring matter. Since flavor is a matter of personal taste, it is probable that some consumers may prefer rice with at least sufficient oil content to affect the flavor. In preparing rice for such consumers, this may be accomplished by omitting one or more of the final extraction steps, or the final washing of the rice may be conducted with a miscella containing sufficient rice oil that a desired proportion of oil is left in the rice. One way to insure that an oil content is left in the rice which roughly approximates that of conventional dry milled rice is to perform the extraction using concurrent flow of miscella and rice throughout all extraction steps from the milling units to the separation steps just preceding the rice desolventizer, with such changes in piping connections and apparatus details from those illustrated as may be required to provide concurrent flow. The required changes in apparatus and operation are so simple as to be obvious from the above description to those skilled in the art and it is therefore believed that such changes need not be described in detail.

It will be readily understood that the milling action at the various rotor and stator clearances above referenced is not, per se, the only source of bran-coat removal action. Intimately interrelated with any bran-coat removal from this source, and complementary thereto, are the effects of inter-particle friction between the grains and their softened bran coats which occurs in the presence of the extractive solvent. Indeed, with wider rotor-stator clearances up to 9/16", the importance of the milling action between the stationary perforate screen and the rotor greatly decreases and such effect is to a major degree, particularly under higher milling chamber pressures, complemented by greater inter-particle friction which readily causes removal of the softened bran-coats of the interacting grain particles in the presence of the extractive solvent which acts as a cooling and flushing agent for the milled grains. The perforations in the stator continue as a means of ingress and egress for the extractive solvent when aiding in bran-coat removal, and the removal of the resulting bran.

When the rotor thus operates at wider clearances with the perforate stator, the agitating effect of its ribbed sections is more pronounced throughout the cross section of the grain mass in much the same manner as a high speed agitator placed more centrally in a vessel produces more violent agitation throughout than if the blades act as scrapers along the inner wall of the vessel. When this action is coupled with the higher rotor speeds specified hereinafter, and longer retention time for the travel of the rice within the cylindrical stator, bran-coat removal will result largely from the softening, dissolution and flushing effects of the bran-coat softening agent and solvent, and by inter-particle friction under the intense agitation which is produced. Such intense agitation and inter-particle friction may also be produced by means other than milling units which are characterized by the presence of a rotor and a perforate stator.

While in the preceding examples descriptions have been furnished of suitable apparatus such as horizontal milling screws, vertical conical extractive mills, basket-type solvent extractors, rotary and hearth types of desolventizers, vertical screw and bucket elevators, conical bottom sludge settlers and pipeline miscella filters, it will be understood that functional equivalents of such apparatus may be substituted for those shown in the process sequence. To illustrate these equivalents a partial tabulation is given below. It will be understood that some of the equipment equivalents listed do not as readily lend themselves to a continuous process, but semi-continuous and batch sequence operations which are functional equivalents are also contemplated.

For example, instead of the series of continuous horizontal milling screws or of the vertical conical-type milling extractors described, the presently available commercial horizontal or vertical milling apparatus may be fitted with solvent circulation features which will allow extractive milling. The latter may be adapted either to discharge the milled rice and bran into separate channels for further extraction and the final desolventizing, as contemplated in FIG. 1 and FIG. 2, or the milled rice and bran may be recombined after extractive milling for further extraction and the desolventizing step while so intermingled as described in FIG. 4. For the further extraction and recovery of the bran sludge solids, instead of settling tanks and/or rotary filters, centrifuges may be employed. For the hearth type and rotary desolventizers shown in FIG. 2 stationary column, moving bed fluidized, countercurrent tower or vacuum desolventizers and numerous adaptations and combinations of desolventizer types which operate under vacuum, at atmospheric pressure or under pressures above atmospheric may be used. The desolventizing medium may be saturated or superheated steam, superheated solvent vapor or inert gases or flue gases.

The term "milling" as used hereinabove and in the appended claims is a generic descriptive term which is intended to be inclusive of any means for the softening, dissolution and mechanical removal of the bran-coat from brown rice kernels in the presence of a volatile extractive solvent.

It is believed that the above descriptions of the several embodiments of the methods, materials, proportions and apparatus of the present invention are sufficient that it is apparent that the same may be widely used without central departure therefrom; also that all such modifications and departures are contemplated as falling within the scope of the appended claims.

From the foregoing it will be seen that this invention is one well adapted to attain all of the ends and objects hereinabove set forth, together with other advantages, which are obvious and which are inherent to the process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An improved process for milling rice comprising milling bran from kernels of brown rice under sufficient pressure on the rice to mechanically remove the bran coat and extracting fatty components from the rice and bran with a sufficient quantity of a volatile liquid organic solvent to extract a substantial amount of the fatty components of the rice and bran during the milling step.

2. An improved process for milling rice comprising milling bran from kernels of brown rice under sufficient pressure on the rice to mechanically remove the bran coat; extracting fatty components from rice and bran with a sufficient quantity of a volatile liquid organic solvent to extract a substantial amount of the fatty components of the rice and bran during the milling step; separating solvent containing fatty components from milled rice and bran; and separating a rice oil from the solvent.

3. An improved process for milling rice comprising intimately mixing brown rice with a liquid bran-softening agent; milling bran from kernels of the brown rice under sufficient pressure on the rice to mechanically remove the bran coat in the presence of the liquid bran-softening agent; extracting fatty components from rice and bran with a sufficient quantity of a volatile liquid organic solvent to extract a substantial amount of the fatty components of the rice and bran during the milling step; separating solvent containing fatty components from milled rice and bran; and separating a rice oil from the solvent.

4. An improved process for milling rice comprising intimately mixing brown rice with rice oil in quantity sufficient to soften bran on kernels of the brown rice; milling bran from kernels of the brown rice under sufficient pressure on the rice to mechanically remove the bran coat in the presence of the rice oil; extracting the rice oil mixed with the rice and fatty components from rice and bran with a sufficient quantity of a volatile liquid organic solvent to extract a substantial amount of the fatty components of the rice and bran during the milling step; separating solvent containing fatty components from the milled rice and bran; and separating a rice oil from the solvent.

5. The process of claim 4 wherein the rice oil mixed with brown rice is recycled rice oil separated from the solvent.

6. The process of claim 4 wherein the rice oil contains a substantial proportion of residual solvent and is recycled from the rice oil-solvent separation.

7. An improved process for milling rice comprising milling bran from kernels of brown rice under sufficient pressure on the rice to mechanically remove the bran coat; extracting fatty components from the bran and rice with a sufficient quantity of a volatile liquid organic solvent to extract a substantial amount of the fatty components of the rice and bran during the milling step; withdrawing milled rice and bran from the milling step; separating excess solvent from the milled rice and bran; recovering rice oil from separated solvent; and evaporating residual solvent from milled rice and bran.

8. The process of claim 7 wherein unseparated milled rice and bran are withdrawn from the milling step.

9. The process of claim 7 wherein a substantial proportion of bran is separated from milled rice during the milling step.

10. An improved process for milling rice comprising milling bran from kernels of brown rice under sufficient pressure on the rice to mechanically remove the bran coat; extracting fatty components from the bran and rice with a sufficient quantity of a volatile liquid organic solvent to extract a substantial amount of the fatty components of the rice and bran during the milling step; withdrawing unseparated milled rice and bran from the milling step; washing bran from the milled rice in a later extraction step with the solvent; separating excess solvent from milled rice and bran; and recovering rice oil from the solvent.

11. An improved process for milling rice comprising milling bran from kernels of brown rice under sufficient pressure on the rice to mechanically remove the bran coat; and extracting fatty components from the rice and bran with a sufficient quantity of a volatile liquid organic solvent containing a bran-softening agent to remove a substantial amount of the fatty components of the rice and bran during the milling step.

12. An improved rice milling process comprising milling bran from kernels of brown rice under sufficient pressure on the rice to mechanically remove the bran coat; extracting fatty components from the rice and bran with a sufficient quantity of a volatile liquid organic solvent to extract a substantial amount of the fatty components of the rice and bran in a plurality of extraction steps, one of said extraction steps being performed during the milling step, and the remaining extraction steps being performed subsequent to the milling step; separating solvent containing fatty components from milled rice and bran; and separating a rice oil from the solvent.

13. The process of claim 12 wherein milled rice is moved through the series of extraction steps in one direction and solvent from a succeeding extraction step is introduced into a preceding extraction step.

14. An improved process for milling rice comprising milling bran from kernels of brown rice under sufficient pressure on the rice to mechanically remove the bran coat and extracting fatty components from the rice and bran with a mixture of polar and non-polar liquid organic solvents in sufficient quantity to extract a substantial quantity of fatty components of the rice and bran during the milling step.

15. The process of claim 14 wherein the mixture of polar and non-polar organic solvents contains a small quantity of water in substantially azeotropic proportion.

16. The process of claim 15 wherein the non-polar solvent is a highly refined petroleum fraction and the polar solvent is a material selected from the group consisting of ethanol, isopropanol, ethyl ether, and dichloro-diethyl ether.

17. A process for milling cereal grains selected from the group consisting of rice and barley comprising passing the grains along a tube; subjecting the grains while passing along the tube to a milling operation thereby separating bran from kernels of the grains; during the milling operation, passing a sufficient quantity of a substantially non-aqueous extractive liquid solvent to extract a substantial amount of fatty components of the bran and grains along the tube in contact with the grains; and discharging the kernels at the far end of the casing.

18. A process for milling cereal grains selected from the group consisting of rice and barley comprising passing the grains along a tube; subjecting the grains while passing along the tube to a milling operation thereby separating the bran coats of the grains from kernels thereof; during the milling operation passing a substantially non-aqueous extractive liquid solvent containing a bran layer softening agent along the tube in contact with the grains in an amount sufficient to extract a substantial portion of the fatty components of said bran and grain; and discharging the kernels and the bran at the far end of the tube.

19. A process for milling cereal grains selected from the group consisting of rice and barley comprising passing the grains along a tube; subjecting the grains while passing along the tube to a milling operation thereby separating bran coats of the grains from the kernels thereof; during the milling operation passing a substantially non-aqueous extractive liquid solvent containing a bran layer softening agent along the tube in contact with the grains and in a direction concurrent with the passage of the grains, said solvent being in an amount sufficient to extract a substantial portion of the fatty components of the bran and grains; and discharging the kernels and bran at the far end of the tube.

20. A process for milling cereal grains selected from the group consisting of rice and barley comprising passing the grains along a tube; subjecting the grains while passing along the tube to a milling operation thereby separating the bran coats of the grains from the kernels thereof; during the milling operation passing a substantially non-aqueous extractive liquid solvent containing a bran layer softening agent along the tube in contact with the grains and in a direction opposite to the passage of the grains, said solvent being in an amount sufficient to extract a substantial portion of the fatty components of the bran and grains; and discharging the kernels and bran at the far end of the tube.

21. A process for milling a cereal grain selected from the group consisting of rice and barley comprising passing the grain along the inside of a perforated tube; milling bran from kernels of the grain during their passage through the tube by directing the grain against inside walls of the tube; introducing a substantially non-aqueous extractive liquid solvent containing a bran layer softening agent into the tube in contact with the grain during the milling step in an amount sufficient to extract a substantial portion of fatty components from the bran and grain; passing the bran through openings in the perforated tube; and discharging kernels of the grain at the far end of the tube.

22. A process for milling cereal grain selected from the group consisting of rice and barley comprising passing the grain along the inside of the perforated tube; milling bran coats of the grain from kernels thereof by directing the grains during their passage against inside walls of the tube; during the milling step passing a liquid extractive solvent containing a bran coat softening agent through a confined space outside of the tube in an amount sufficient to carry off the separated bran; during the milling operation contacting the grain and bran with a sufficient amount of the solvent to extract a substantial quantity of fatty components from the bran; and discharging kernels and bran at the far end of the tube.

23. A process for milling cereal grains selected from the group consisting of rice and barley comprising passing the grain along the inside of a perforated tube; milling bran coats of the grain from kernels thereof during their passage through the tube by directing the grain against the inside walls of the tube; passing the bran through openings in the perforated tube; passing a liquid solvent containing a bran softening agent through a confined space outside the tube and through openings in the perforated tube into contact with the grain during the milling step in quantity sufficient to extract a substantial portion of fatty components of said bran and in the direction of the passage of grains along the tube, and discharging the kernels and bran at the far end of the tube.

References Cited by the Examiner

UNITED STATES PATENTS

| | | | |
|---|---|---|---|
| 2,530,272 | 11/1950 | Thrasher | 99—80.1 X |
| 2,829,055 | 4/1958 | Ozai-Durrani | 99—80.1 |
| 3,086,867 | 4/1963 | Miller | 99—80.1 |
| 3,113,032 | 12/1963 | Wayne | 99—80.1 |

A. LOUIS MONACELL, *Primary Examiner.*

RAYMOND N. JONES, *Examiner.*